United States Patent
Suzuki et al.

(10) Patent No.: US 11,316,653 B2
(45) Date of Patent: Apr. 26, 2022

(54) TERMINAL APPARATUS, BASE STATION APPARATUS, AND COMMUNICATION METHOD

(71) Applicants: SHARP KABUSHIKI KAISHA, Sakai (JP); FG Innovation Company Limited, Tuen Mun (HK)

(72) Inventors: Shoichi Suzuki, Sakai (JP); Wataru Ouchi, Sakai (JP); Tomoki Yoshimura, Sakai (JP); Liqing Liu, Sakai (JP); Taewoo Lee, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 94 days.

(21) Appl. No.: 16/757,196

(22) PCT Filed: Oct. 19, 2018

(86) PCT No.: PCT/JP2018/039044
§ 371 (c)(1),
(2) Date: Apr. 17, 2020

(87) PCT Pub. No.: WO2019/078363
PCT Pub. Date: Apr. 25, 2019

(65) Prior Publication Data
US 2021/0126762 A1    Apr. 29, 2021

(30) Foreign Application Priority Data

Oct. 20, 2017  (JP) .............................. JP2017-203695

(51) Int. Cl.
*H04L 5/00* (2006.01)
*H04W 76/27* (2018.01)
(Continued)

(52) U.S. Cl.
CPC .......... *H04L 5/0098* (2013.01); *H04W 72/042* (2013.01); *H04W 72/0453* (2013.01); *H04W 76/27* (2018.02); *H04W 80/02* (2013.01)

(58) Field of Classification Search
CPC .... H04L 5/0098; H04L 5/0053; H04W 76/27; H04W 72/042; H04W 72/0453; H04W 80/02
See application file for complete search history.

(56) References Cited

U.S. PATENT DOCUMENTS

2012/0213207 A1   8/2012  Jang et al.
2017/0201308 A1*  7/2017  Park .................... H04B 7/0417
(Continued)

FOREIGN PATENT DOCUMENTS

JP    2014-510462 A    4/2014

OTHER PUBLICATIONS

MediaTek Inc., "Remaining Details on Bandwidth Part Operation in NR", 3GPP TSG RAN WG1 Meeting 90bis, R1-1718327, Prague, CZ, Oct. 9-13, 2017 (Year: 2017).*
(Continued)

*Primary Examiner* — Farid Seyedvosoghi
(74) *Attorney, Agent, or Firm* — ScienBiziP, P.C.

(57) ABSTRACT

A terminal apparatus is a terminal apparatus for communicating via a primary cell and a secondary cell, the terminal apparatus including: a receiver configured to receive an activation/deactivation MAC CE indicating activation of the secondary cell; and a medium access control layer processing unit configured to: activate a first downlink BWP in multiple downlink BWPs in a case that the activation/deactivation MAC CE is received and the secondary cell is not activated; and not to activate the first downlink BWP in a case that the activation/deactivation MAC CE is received, the secondary cell is activated, and a second downlink BWP (Continued)

of the secondary cell is activated. The first downlink BWP is different from the second downlink BWP.

6 Claims, 10 Drawing Sheets

(51) Int. Cl.
    *H04W 72/04*     (2009.01)
    *H04W 80/02*     (2009.01)

(56) References Cited

U.S. PATENT DOCUMENTS

| | | | | |
|---|---|---|---|---|
| 2018/0279262 | A1* | 9/2018 | Babaei | H04W 72/04 |
| 2019/0082355 | A1* | 3/2019 | Ryoo | H04W 72/02 |
| 2019/0097874 | A1* | 3/2019 | Zhou | H04L 5/0023 |

OTHER PUBLICATIONS

"3rd Generation Partnership Project; Technical Specification Group Radio Access Network; NR; Physical channels and modulation (Release 15)", 3GPP TS 38.211 V1.0.0 (Sep. 2017).
"3rd Generation Partnership Project; Technical Specification Group Radio Access Network; NR; Multiplexing and channel coding (Release 15)", 3GPP TS 38.212 V1.0.0 (Sep. 2017).
"3rd Generation Partnership Project; Technical Specification Group Radio Access Network; NR; Physical layer procedures for control (Release 15)", 3GPP TS 38.213 V1.0.1 (Sep. 2017).
"3rd Generation Partnership Project; Technical Specification Group Radio Access Network; NR; Physical layer procedures for data (Release 15)", 3GPP TS 38.214 V1.0.1 (Sep. 2017).
Intel Corporation, "Activation of SCell containing BWPs", R2-1711643, 3GPP TSG-RAN WG2 Meeting #99bis, Prague, Czech, Oct. 9-13, 2017.
Oppo, "Activation and deactivation of SCells", R2-1710135 3GPP TSG RAN WG2 #99-Bis Prague, Czech Republic, Oct. 9-13, 2017.
Vivo, "Discussion on the activation/deactivation of the bandwidth part", R1-1712870 3GPP TSG RAN WG1 Meeting#90 Prague, Czech Republic, Aug. 21-25, 2017.
Mediatek Inc., "Summary of Bandwidth Part Operation", R1-1718901 3GPP TSG RAN WG1 Meeting 90bis Prague, CZ, Oct. 9-13, 2017.
Mediatek Inc, "Remaining Details on Bandwidth Part Operation in NR", R1-1718327, 3GPP TSG RAN WG1 Meeting 90bis Prague, CZ, Oct. 9-13, 2017.
Huawei [To Be RAN2], "[Draft] LS on RAN2 agreements related to BWP", R2-1711872, 3GPP TSG-RAN WG2#99bis Meeting, Prague, Czech Republic, Oct. 9-13, 2017.

* cited by examiner

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2017-203695 filed on Oct. 20, 2017, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP). In 3GPP, a new radio access method (hereinafter referred to as "New Radio (NR)") has been studied. In LTE, a base station apparatus is also referred to as an evolved NodeB (eNodeB). In NR, a base station apparatus is also referred to as a gNodeB. In LTE, and in NR, a terminal apparatus is also referred to as a User Equipment (UE). LTE, as well as NR, is a cellular communication system in which multiple areas are deployed in a cellular structure, with each of the multiple areas being covered by a base station apparatus. A single base station apparatus may manage multiple cells.

In NR, a set of bandwidth parts (BWPs) is configured for one serving cell (NPL 3). The terminal apparatus receives a PDCCH and a PDSCH in the BWPs.

CITATION LIST

Non Patent Literature

NPL 1: "3GPP TS 38.211 V1.0.0 (2017-09), NR; Physical channels and modulation", 7 Sep. 2017.
NPL 2: "3GPP TS 38.212 V1.0.0 (2017-09), NR; Multiplexing and channel coding", 7 Sep. 2017.
NPL 3: "3GPP TS 38.213 V1.0.1 (2017-09), NR; Physical layer procedures for control", 7 Sep. 2017.
NPL 4: "3GPP TS 38.214 V1.0.1 (2017-09), NR; Physical layer procedures for data", 7 Sep. 2017.

SUMMARY OF INVENTION

Technical Problem

One aspect of the present invention provides a terminal apparatus capable of efficiently performing reception of downlink transmission, a communication method used for the terminal apparatus, a base station apparatus capable of efficiently performing downlink transmission, and a communication method used for the base station apparatus.

Solution to Problem (1) According to some aspects of the present invention, the following measures are provided. Specifically, a first aspect of the present invention is a terminal apparatus that performs communication via a primary cell and a secondary cell, the terminal apparatus including: a receiver configured to receive an activation/deactivation Medium Access Control (MAC) Control Element (CE) indicating activation of the secondary cell; and a medium access control layer processing unit configured to: activate a first downlink bandwidth part (BWP) in multiple downlink BWPs included in the secondary cell in a case that the activation/deactivation MAC CE is received and the secondary cell is not activated; and not to activate the first downlink BWP in a case that the activation/deactivation MAC CE is received, the secondary cell is activated, and a second downlink BWP of the secondary cell is activated. In the terminal apparatus, the first downlink BWP is different from the second downlink BWP.

(2) A second aspect of the present invention is a terminal apparatus, wherein activating the first downlink BWP is indicated by a Radio Resource Control (RRC) message received from a base station apparatus.

(3) A third aspect of the present invention is a base station apparatus that performs communication via a primary cell and a secondary cell, the base station apparatus including: a transmitter configured to transmit an activation/deactivation Medium Access Control (MAC) Control Element (CE) indicating activation of the secondary cell to a terminal apparatus; and a medium access control layer processing unit configured to control a downlink bandwidth part (BWP) to be activated in multiple downlink BWPs included in the secondary cell by transmitting the activation/deactivation MAC CE, wherein a first downlink BWP in the multiple downlink BWPs is activated by the terminal apparatus in a case that the terminal apparatus receives the activation/deactivation MAC CE and the secondary cell is not activated, and the first downlink BWP in the multiple downlink BWPs is not activated by the terminal apparatus in a case that the terminal apparatus receives the activation/deactivation MAC CE, the secondary cell is activated, and a second downlink BWP of the secondary cell is activated. In the base station apparatus, the first downlink BWP is different from the second downlink BWP.

(4) A fourth aspect of the present invention is a base station apparatus, wherein activating the first downlink BWP is indicated by transmitting a Radio Resource Control (RRC) message.

(5) A fifth aspect of the present invention is a communication method used for a terminal apparatus that performs communication via a primary cell and a secondary cell, the communication method including the steps of: receiving an activation/deactivation Medium Access Control (MAC) Control Element (CE) indicating activation of the secondary cell; activating a first downlink bandwidth part (BWP) in multiple downlink BWPs included in the secondary cell in a case that the activation/deactivation MAC CE is received and the secondary cell is not activated; and not activating the first downlink BWP in a case that the activation/deactivation MAC CE is received, the secondary cell is activated, and a second downlink BWP of the secondary cell is activated, wherein the first downlink BWP is different from the second downlink BWP.

(6) A sixth aspect of the present invention is a communication method used for a base station apparatus that performs communication via a primary cell and a secondary cell, the communication method including the steps of: transmitting an activation/deactivation Medium Access Control (MAC) Control Element (CE) indicating activation of the secondary cell to a terminal apparatus; and controlling a downlink bandwidth part (BWP) to be activated in multiple downlink BWPs included in the secondary cell by transmitting the activation/deactivation MAC CE, wherein a first downlink BWP in the multiple downlink BWPs is activated by the terminal apparatus in a case that the terminal apparatus receives the activation/deactivation MAC CE and the secondary cell is not activated, the first downlink BWP in the multiple downlink BWPs is not activated by the terminal apparatus in a case that the terminal apparatus receives the activation/deactivation MAC CE, the secondary cell is activated, and a second downlink BWP of the secondary cell is activated, and the first downlink BWP is different from the second downlink BWP.

Advantageous Effects of Invention

According to one aspect of the present invention, the terminal apparatus can efficiently perform reception of downlink transmission. The base station apparatus can efficiently perform downlink transmission.

DESCRIPTION OF EMBODIMENTS

Embodiments of the present invention will be described below.

Figure 1:
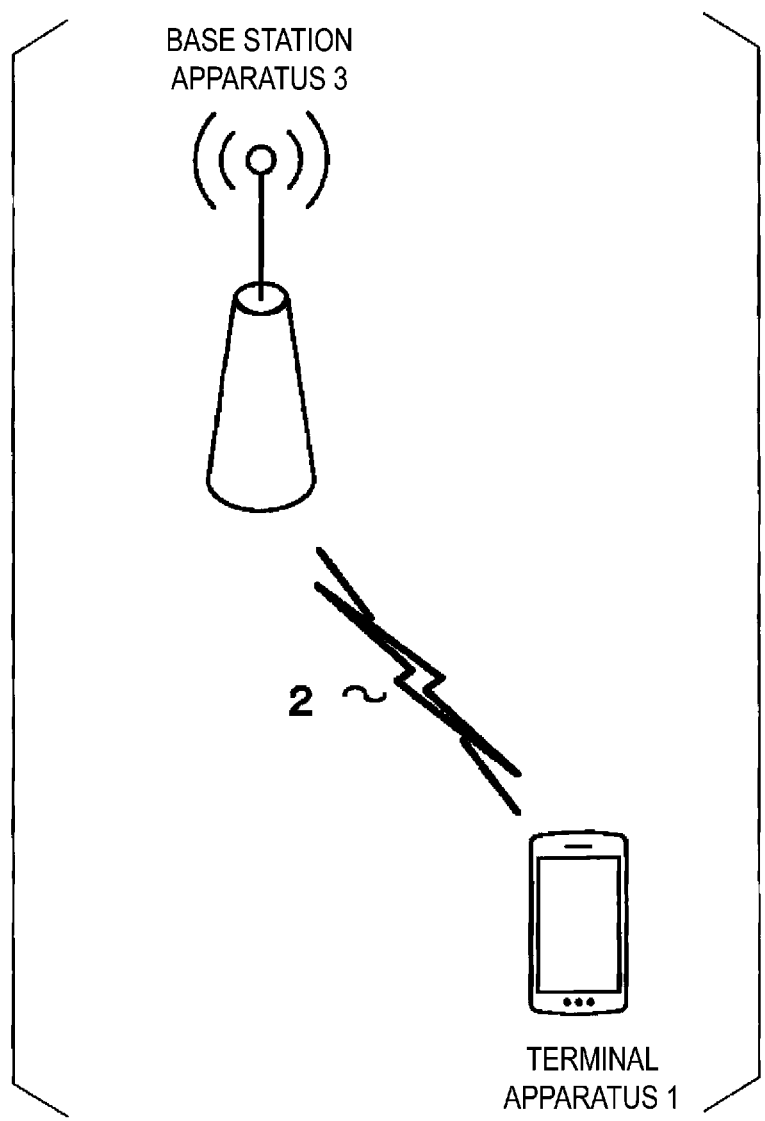
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 1 and a base station apparatus 3.

Physical channels and physical signals according to the present embodiment will be described.

In uplink radio communication from the terminal apparatus 1 to the base station apparatus 3, the following uplink physical channels are used. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used for transmitting Channel State Information (CSI) of the downlink, and/or, Hybrid Automatic Repeat reQuest (HARQ-ACK). The CSI, as well as the HARQ-ACK, is Uplink Control Information (UCI).

The PUSCH is used for transmitting uplink data (Transport block, Uplink-Shared Channel (UL-SCH)), the CSI of the downlink, and/or the HARQ-ACK. The CSI, as well as the HARQ-ACK, is Uplink Control Information (UCI). The terminal apparatus 1 may transmit the PUSCH, based on detection of Physical Downlink Control Channel (PDCCH) including an uplink grant.

The PRACH is used to transmit a random access preamble.

The following uplink physical signal is used in the uplink radio communication. The uplink physical signal is not used for transmitting information output from a higher layer, but is used by a physical layer.

Demodulation Reference Signal (DMRS)

The DMRS is associated with transmission of the PUSCH or the PUCCH. The DMRS may be time-multiplexed with the PUSCH. The base station apparatus 3 may use the DMRS in order to perform channel compensation of the PUSCH.

The following downlink physical channels are used for downlink radio communication from the base station apparatus 3 to the terminal apparatus 1. The downlink physical channels are used for transmitting information output from the higher layer.

Physical Downlink Control Channel (PDCCH)
Physical Downlink Shared Channel (PDSCH)

The PDCCH is used to transmit Downlink Control Information (DCI). The downlink control information is also referred to as a DCI format. The downlink control information includes an uplink grant. The uplink grant may be used for scheduling of a single PUSCH within a single cell. The uplink grant may be used for scheduling multiple PUSCHs in multiple slots within a single cell. The uplink grant may be used for scheduling a single PUSCH in multiple slots within a single cell.

The PDSCH is used to transmit downlink data (Transport block, Downlink-Shared Channel (DL-SCH)).

The UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU).

Hereinafter, carrier aggregation will be described.

According to the present embodiment, one or multiple serving cells are configured for the terminal apparatus 1. A technology in which the terminal apparatus 1 communicates via the multiple serving cells is referred to as cell aggregation or carrier aggregation. An aspect of the present invention may be applied to each of the multiple serving cells configured for the terminal apparatus 1. An aspect of the present invention may be applied to some of the multiple serving cells configured. The multiple serving cells includes at least one primary cell. Here, the multiple serving cells may include at least one of multiple secondary cells.

The primary cell is a serving cell in which an initial connection establishment procedure has been performed, a serving cell in which a connection re-establishment procedure has been initiated, or a cell indicated as a primary cell in a handover procedure. The secondary cell may be configured at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component carriers). A single physical channel is transmitted in a single serving cell (component carrier) out of the multiple serving cells (component carriers).

A set of downlink bandwidth parts (BWPs) may be configured for each serving cell. The set of downlink BWPs may include one or multiple downlink BWPs. The downlink BWP included in the set of downlink BWPs for the serving cell is also referred to as the downlink BWP in the serving cell or the downlink BWP included in the serving cell. One physical channel is transmitted in one downlink BWP out of multiple downlink BWPs. One downlink BWP may be constituted by multiple continuous physical resource blocks in the frequency domain.

A configuration of the radio frame according to the present embodiment will be described below.

Figure 2:
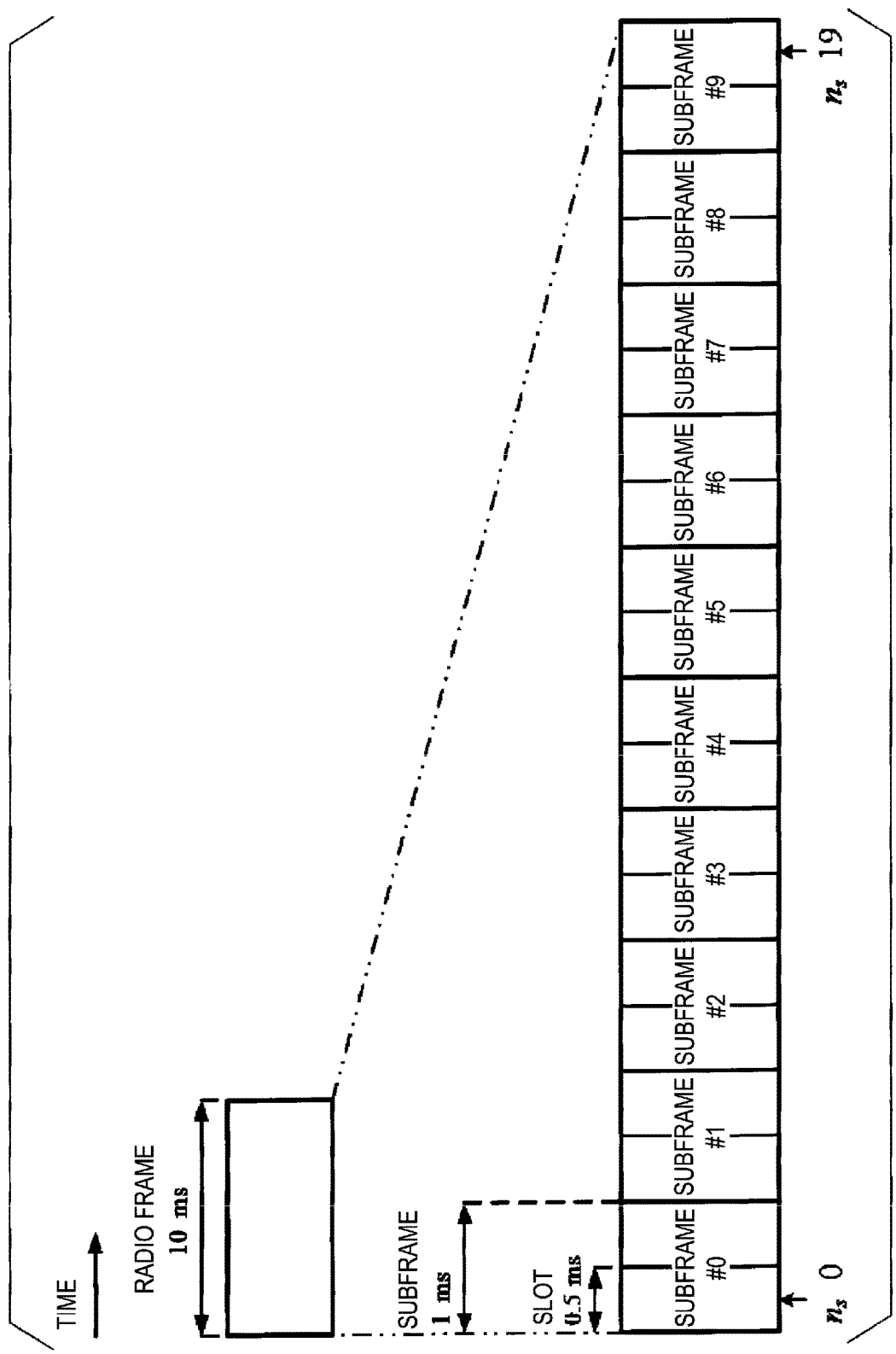
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames may be 10 ms in length. Each of the radio frames may include ten slots. Each of the slots may be 1 ms in length.

Figure 3:
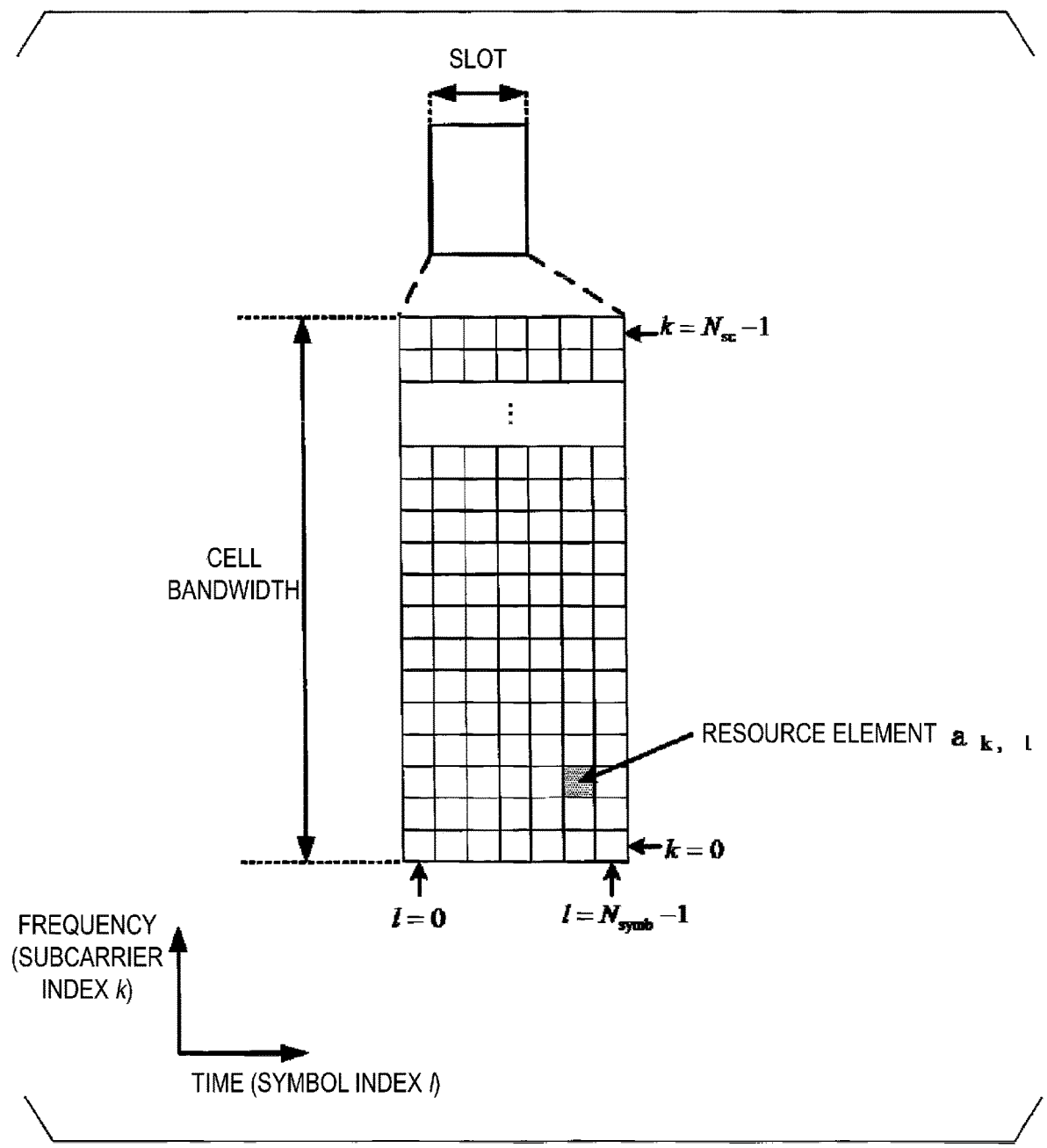
FIG. 3 is a diagram illustrating a schematic configuration of an uplink slot according to the present embodiment.

An example of a configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, the horizontal axis is a time axis, and the vertical axis is a frequency axis. The uplink slot may include $N^{UL}_{symb}$ SC-FDMA symbols. The uplink slot may include $N^{UL}_{symb}$ OFDM symbols. Hereinafter, a case that the uplink slot includes OFDM symbols will be described in the present embodiment, but the present embodiment can be applied to a case that the uplink slot includes SC-FDMA symbols.

In FIG. 3, l is an OFDM symbol number/index, and k is a subcarrier number/index. The physical signal or the physical channel transmitted in each of the slots is expressed by a resource grid. In the uplink, the resource grid is defined by multiple subcarriers and multiple OFDM symbols. Each element within the resource grid is referred to as a resource element. The resource element is expressed by a subcarrier number/index k and an OFDM symbol number/index l.

The uplink slot includes the multiple OFDM symbols l (l=0, 1, ..., $N^{UL}_{symb}$) in the time domain. For a normal Cyclic Prefix (CP) in the uplink, $N^{UL}_{symb}$ may be 7 or 14. For an extended CP in the uplink, $N^{UL}_{symb}$ may be 6 or 12.

The terminal apparatus 1 receives the parameter UL-CyclicPrefixLength of the higher layer indicating the CP length in the uplink from the base station apparatus 3. The base station apparatus 3 may broadcast, in the cell, system information including the parameter UL-CyclicPrefixLength of the higher layer corresponding to the cell.

The uplink slot includes the multiple subcarriers k (k=0, 1, ..., $N^{UL}_{RB}*N^{RB}_{SC}$) in the frequency domain. $N^{UL}_{RB}$ is an uplink bandwidth configuration for the serving cell expressed by a multiple of $N^{RB}_{SC}$. $N^{RB}_{SC}$ is the (physical) resource block size in the frequency domain expressed by the number of subcarriers. The subcarrier spacing Δf may be 15 kHz. The $N^{RB}_{SC}$ may be 12. The (physical) resource block size in the frequency domain may be 180 kHz.

One physical resource block is defined by $N^{UL}_{symb}$ continuous OFDM symbols in the time domain and by $N^{RB}_{SC}$ continuous subcarriers in the frequency domain. Hence, one physical resource block is constituted by ($N^{UL}_{symb}*N^{RB}_{SC}$) resource elements. One physical resource block may correspond to one slot in the time domain. The physical resource blocks may be numbered $n_{RRB}$ (0, 1, ..., $N^{UL}_{RB}-1$) in the ascending order of frequencies in the frequency domain.

The downlink slot according to the present embodiment includes multiple OFDM symbols. Since the configuration of the downlink slot according to the present embodiment is basically the same as the configuration of the uplink slot, the description of the configuration of the downlink slot will be omitted.

Configurations of apparatuses according to the present embodiment will be described below.

Figure 4:
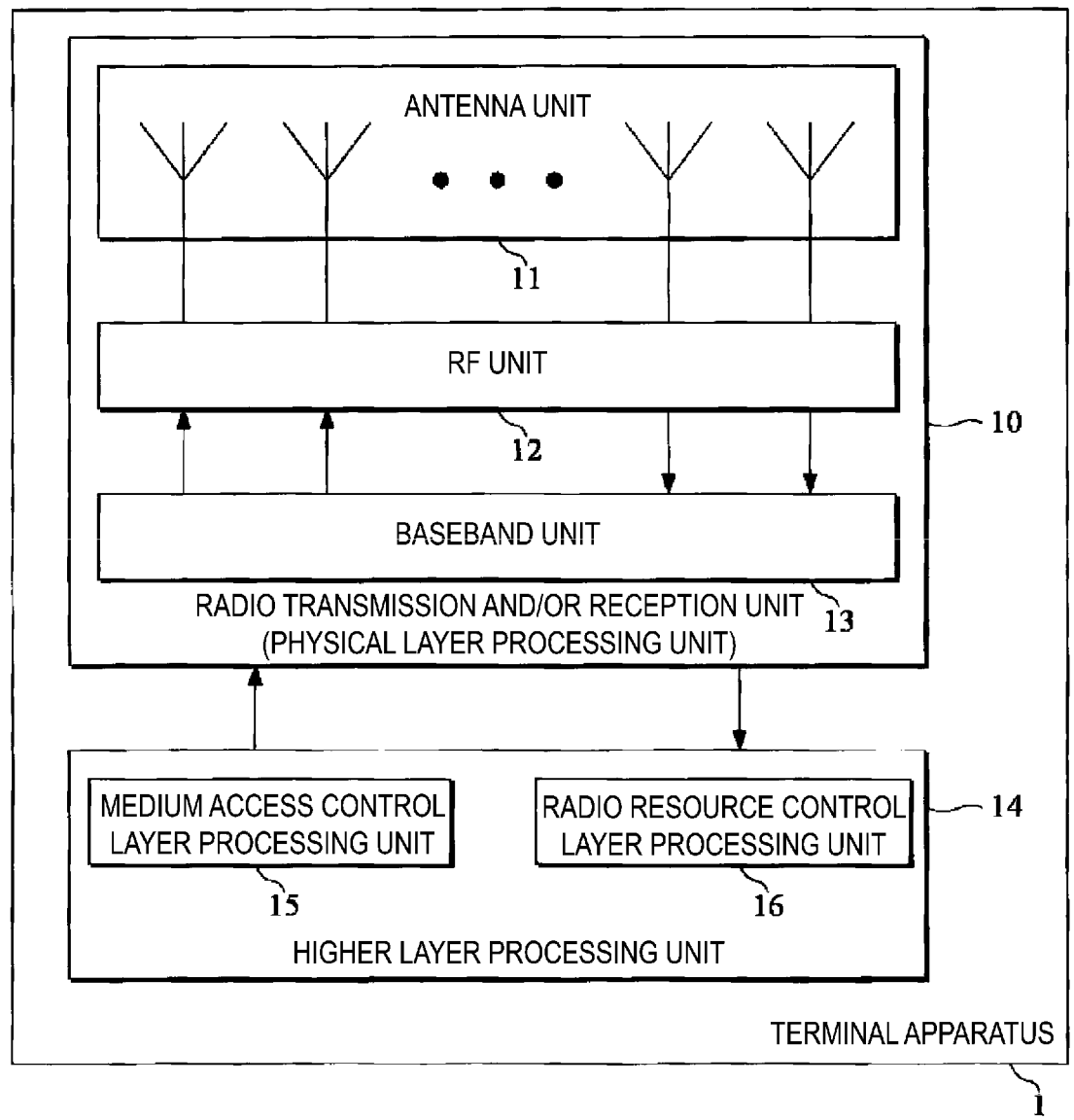
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a coding unit, a decoding unit, or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls random access procedure in accordance with the various configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of the terminal apparatus 1. The radio resource control layer processing unit 16 sets various types of configuration information/parameters, based on a higher layer signal received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. The RF unit 12 amplifies power. The RF unit 12 may have a function of controlling transmit power. The RF unit 12 is also referred to as a transmit power control unit.

Figure 5:
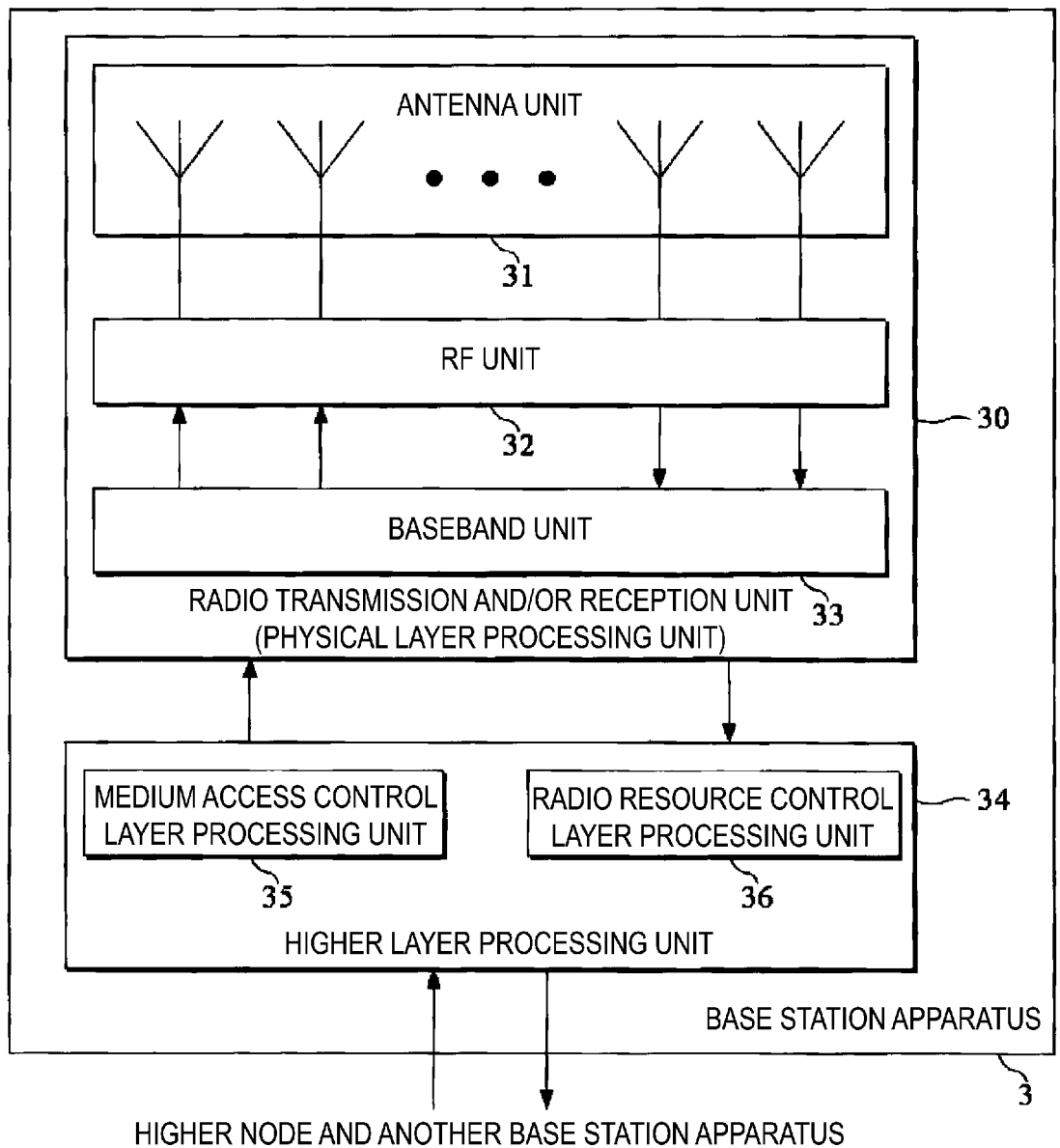
FIG. 5 is a schematic block diagram illustrating a configuration of a base station apparatus 3 according to the present embodiment.

FIG. 5 is a schematic block diagram illustrating a configuration of the base station apparatus 3 according to the present embodiment. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, a coding unit, a decoding unit, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 controls random access procedure in accordance with the various configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. The radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit. Each of the units having the reference signs 10 to 16 included in the terminal apparatus 1 may be configured as at least one processor and a memory coupled to the at least one processor. Each of the units having the reference signs 30 to 36 included in the base station apparatus 3 may be configured as at least one processor and a memory coupled to the at least one processor.

Figure 6:
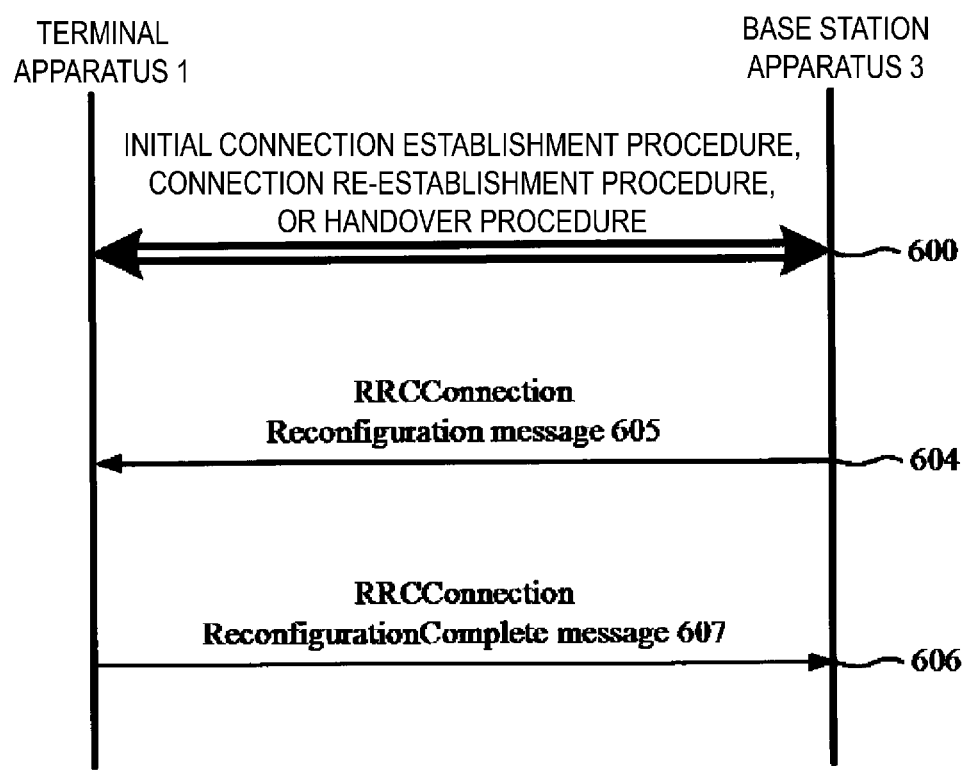
FIG. 6 is a diagram illustrating a sequence chart related to a configuration of a serving cell and a downlink BWP according to the present embodiment.

FIG. 6 is a diagram illustrating a sequence chart related to a configuration of a serving cell and a downlink BWP according to the present embodiment.

In 600, the terminal apparatus 1 performs an initial connection establishment procedure, a connection re-establishment procedure, or a handover procedure in the initial downlink BWP in the primary cell.

In 604, the terminal apparatus 1 receives the RRCConnectionReconfiguration message 605. The RRCConnectionReconfiguration message 605 may include configuration information of a set of downlink BWPs for the primary cell, a secondary cell, and a set of downlink BWPs for the secondary cell. The terminal apparatus 1 may configure, based on the configuration information, the set of downlink BWPs for the primary cell, the secondary cell, and the set of downlink BWPs for the secondary cell.

In 607, the terminal apparatus 1 transmits an RRCConnectionComplete message 607 after the configuration based on the RRCConnectionReconfiguration message 605 is completed.

Hereinafter, the activation of the downlink BWP will be described.

Activating the downlink BWP means applying the monitoring of the PDCCH in the downlink BWP.

At one point of time, at most one downlink BWP may be activated in one serving cell. Namely, multiple downlink BWPs are not simultaneously activated in one serving cell.

One downlink BWP may always be activated in the primary cell. All the downlink BWPs may not be activated in the secondary cell. The serving cell including an activated downlink BWP is also referred to as an activated serving cell. A serving cell not including an activated downlink BWP is also referred to as a deactivated serving cell. A secondary cell including an activated downlink BWP is also referred to as an activated secondary cell. A secondary cell not including an activated downlink BWP is also referred to as a deactivated secondary cell. In other words, the primary cell is always activated. Activating any downlink BWP in a secondary cell in which no downlink BWP is activated means activating the secondary cell. Deactivating all the activated downlink BWPs in the secondary cell means deactivating the secondary cell.

The initial downlink BWP in the primary cell may be activated until a set of downlink BWPs is configured for the primary cell. Based on the set of the downlink BWPs being configured for the primary cell, the initial downlink BWP may be deactivated and any one of the downlink BWPs in the set of the downlink BWPs for the primary cell may be activated. The RRCConnectionReconfiguration message 605 may include information indicating a downlink BWP to be activated based on the set of downlink BWPs being configured for the primary cell. Deactivating the activated downlink BWP and activating the deactivated downlink BWP means switching of the activated downlink BWP from a downlink BMP to another downlink BWP.

At the time when the secondary cell is added, all the downlink BWPs in the secondary cell may be deactivated. The base station apparatus 3 can activate and deactivate the configured secondary cell by transmitting activation/deactivation Medium Access Control (MAC) Control Element (CE). The activation/deactivation MAC CE is MAC layer control information. The terminal apparatus 1 may transmit, to the base station apparatus 3, a HARQ-ACK for the PDSCH including the activation/deactivation MAC CE, by using the PUCCH.

The terminal apparatus 1 may activate the configured secondary cell, based on the reception of the activation/deactivation MAC CE indicating activation of the configured serving cell. The terminal apparatus 1 may deactivate the configured secondary cell, based on the reception of the activation/deactivation MAC CE indicating deactivation of the configured serving cell.

Figure 7:
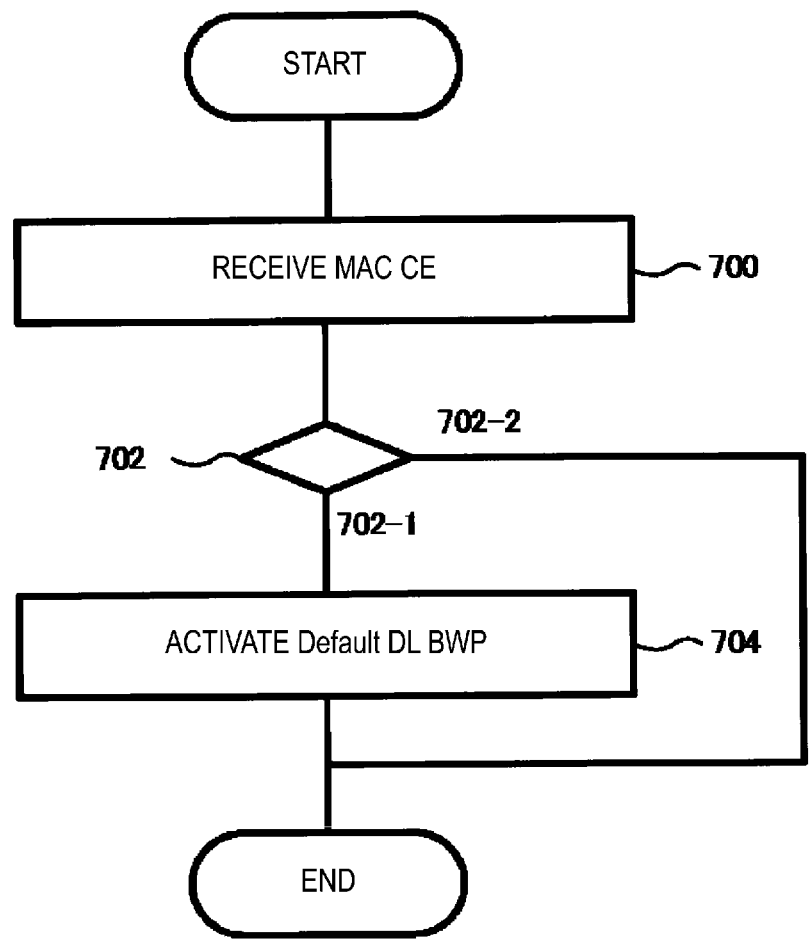
FIG. 7 is a diagram illustrating a flow related to activation of a secondary cell according to the present embodiment.

FIG. 7 is a diagram illustrating a flow related to activation of a secondary cell according to the present embodiment.

In 700, the terminal apparatus 1 receives the activation/deactivation MAC CE indicating the activation of the secondary cell.

The set of downlink BWPs for the secondary cell may include one default downlink BWP and one or multiple non-default downlink BWPs. The non-default downlink BWP in the secondary cell is also referred to as a downlink BWP other than the default downlink BWP out of the multiple downlink BWPs in the secondary cell. The RRCConnectionReconfiguration message 605 may include information indicating a default downlink BWP and/or a non-default downlink BWP in the secondary cell.

In 702, the terminal apparatus 1 may determine whether the non-default downlink BWP in the secondary cell is activated.

(702-1) In a case that the non-default downlink BWP in the secondary cell is not activated, the terminal apparatus 1 may activate the default downlink BWP in the secondary cell and finish the process related to activation of the secondary cell.

(702-2) In a case that the non-default downlink BWP in the secondary cell is activated, the terminal apparatus 1 may end the processing related to the activation of the secondary cell without activating the default downlink BWP in the secondary cell.

In 702, the terminal apparatus 1 may determine whether any downlink BWP in the secondary cell is activated.

(702-1) In a case that none of the downlink BWPs in the secondary cell is activated, the terminal apparatus 1 may activate the default downlink BWP in the secondary cell and finish the processing relating to activation of the secondary cell.

(702-2) In a case that any one of the downlink BWPs in the secondary cell is activated, the terminal apparatus 1 may finish the processing related to the activation of the secondary cell without activating the default downlink BWP in the secondary cell.

The base station apparatus 3 can perform switching of the activated downlink BWP from a downlink BMP to another downlink BWP by transmitting the downlink control information. An index may be allocated to the downlink BWP. The downlink control information may include BWP index information indicating the index of the downlink BWP. The downlink control information may include information indicating resources allocated for the PDSCH in the downlink BWP indicated by the BWP index information.

In a case that the terminal apparatus 1 receives the downlink control information including the BWP index information indicating the deactivated downlink BWP in the serving cell including the activated downlink BWP, the terminal apparatus 1 may perform switching of the activated downlink BWP in the serving cell from a downlink BMP to another downlink BWP indicated by information indicating the downlink BWP.

In a case that, in an activated downlink BWP in a certain serving cell, the terminal apparatus 1 receives downlink control information including BWP index information indicating a deactivated downlink BWP in the certain serving cell, the terminal apparatus 1 may perform switching of the activated downlink BWP from a downlink BMP to another downlink BWP indicated by information indicating the downlink BWP, in the certain serving cell.

In an activated downlink BWP in a certain serving cell, the terminal apparatus 1 may not switch, based on the reception of the downlink control information including the BWP index information indicating the deactivated downlink BWP in the other serving cell, the activated downlink BWP in the certain serving cell.

Figure 8:
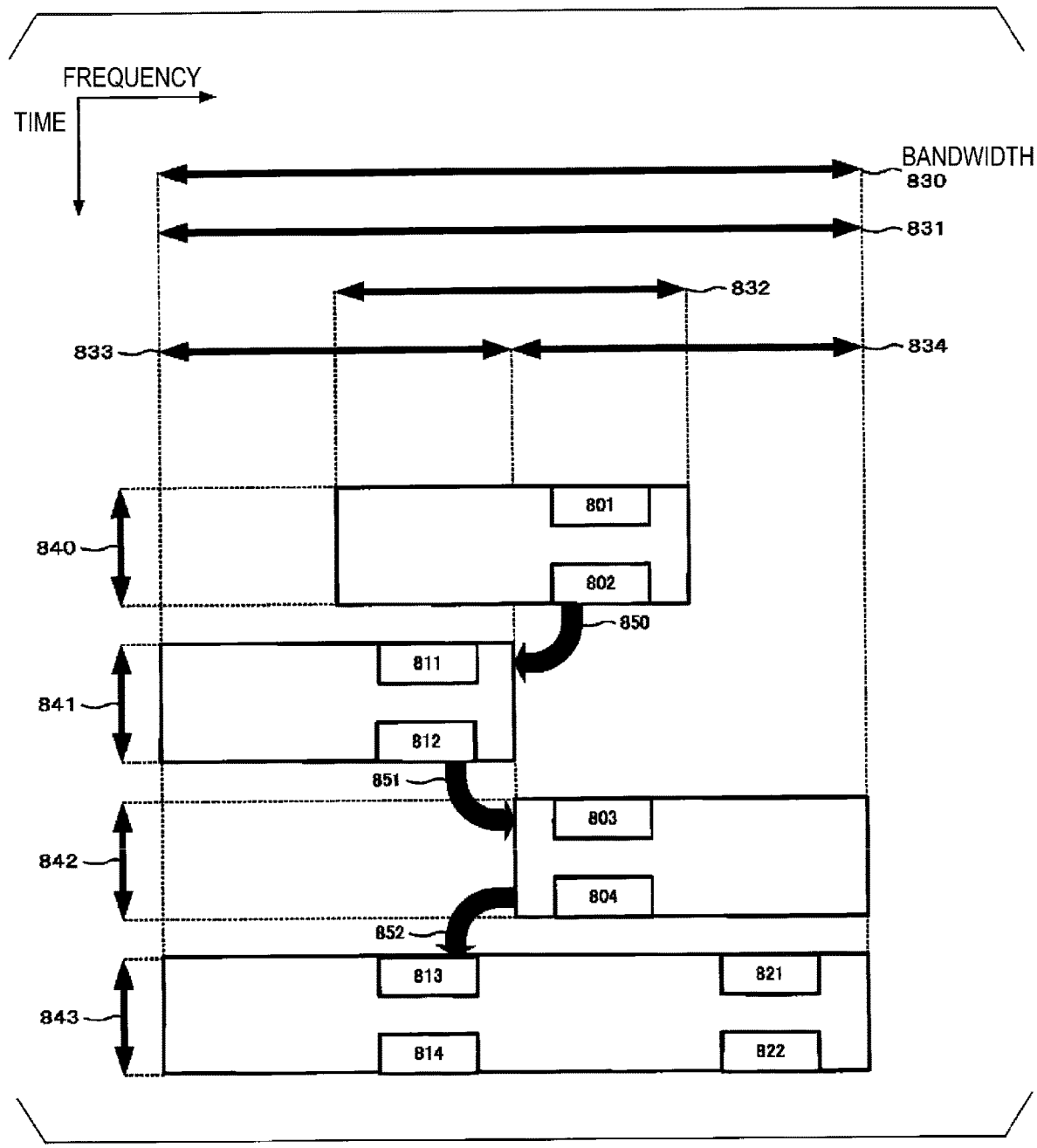
FIG. 8 is a diagram illustrating an example of a downlink BWP of a secondary cell according to the present embodiment.

FIG. 8 is a diagram illustrating an example of a downlink BWP of a secondary cell according to the present embodiment.

830 is the bandwidth of the secondary cell. The bandwidth 830 includes downlink BWPs 831, 832, 833, and 834. The downlink BWP 832 may be a default downlink BWP. The downlink BWPs 831, 833, and 834 may be non-default downlink BWPs.

The numeral 840 denotes a period during which the downlink BWP 832 is activated. The numeral 841 denotes a period during which the downlink BWP 833 is activated. The numeral 842 denotes a period during which the downlink BWP 834 is activated. The numeral 843 denotes a period during which the downlink BWP 831 is activated.

Based on the downlink BWPs 831, 832, 833, and 834 being deactivated, and receiving the activation/deactivation MAC CE indicating the activation of the secondary cell, the terminal apparatus 1 may activate the default downlink BWP 832.

Based on the default downlink BWP 832 being activated, the downlink BWPs 831, 833, and 834 being deactivated, and receiving the activation/deactivation MAC CE indicating the activation of the secondary cell, the terminal apparatus 1 may activate the default downlink BWP 832.

(850) Based on detecting the PDCCH including the BWP index indicating the downlink BWP 833 in the downlink BWP 832 in 840, the terminal apparatus 1 may deactivate the activated downlink BWP 832 and activate the deactivated downlink BWP 833.

(851) Based on detecting the PDCCH including the BWP index indicating the downlink BWP 834 in the downlink BWP 833 in 841, the terminal apparatus 1 may deactivate the activated downlink BWP 833 and activate the deactivated downlink BWP 834.

(852) Based on detecting the PDCCH including the BWP index indicating the downlink BWP 831 in the downlink BWP 834 in 842, the terminal apparatus 1 may deactivate the activated downlink BWP 834 and activate the deactivated downlink BWP 831.

Based on the reception of the activation/deactivation MAC CE indicating the deactivation of the secondary cell in 843, the terminal apparatus 1 may deactivate the downlink BWP 831.

80X (X=1, 2, 3, 4), 81Y (Y=1, 2, 3, 4) and, 82Z (1, 2) are CORESETs. The terminal apparatus 1 monitors a PDCCH in a CORESET. 80X corresponds to a configuration of the first CORESET. 81Y corresponds to a configuration of the second CORESET. 82Z corresponds to a configuration of the third CORESET. The configuration of CORESET may indicate at least the bandwidth of CORESET, the number of OFDM symbols constituting CORESET, and/or the cycle of CORESET.

The downlink BWP 831 corresponds to the configuration of the second CORESET and the configuration of the third CORESET. The downlink BWP 832 corresponds to the configuration of the first CORESET. The downlink BWP 833 corresponds to the configuration of the second CORESET. The downlink BWP 834 corresponds to the configuration of the first CORESET.

In a case that the downlink BWP 831 is activated, the terminal apparatus 1 may monitor the PDCCH in the second CORESET (813, 814) corresponding to the configuration of the second CORESET and the third CORESET (821, 822) corresponding to the configuration of the third CORESET.

In a case that the downlink BWP 832 is activated, the terminal apparatus 1 may monitor the PDCCH in the first CORESET (801, 802) corresponding to the configuration of the first CORESET.

In a case that the downlink BWP 833 is activated, the terminal apparatus 1 may monitor the PDCCH in the second CORESET (811, 812) corresponding to the configuration of the second CORESET.

In a case that the downlink BWP 834 is activated, the terminal apparatus 1 may monitor the PDCCH in the first CORESET (803, 804) corresponding to the configuration of the first CORESET.

Hereinafter, control resource set (CORESET) will be described.

Figure 9:
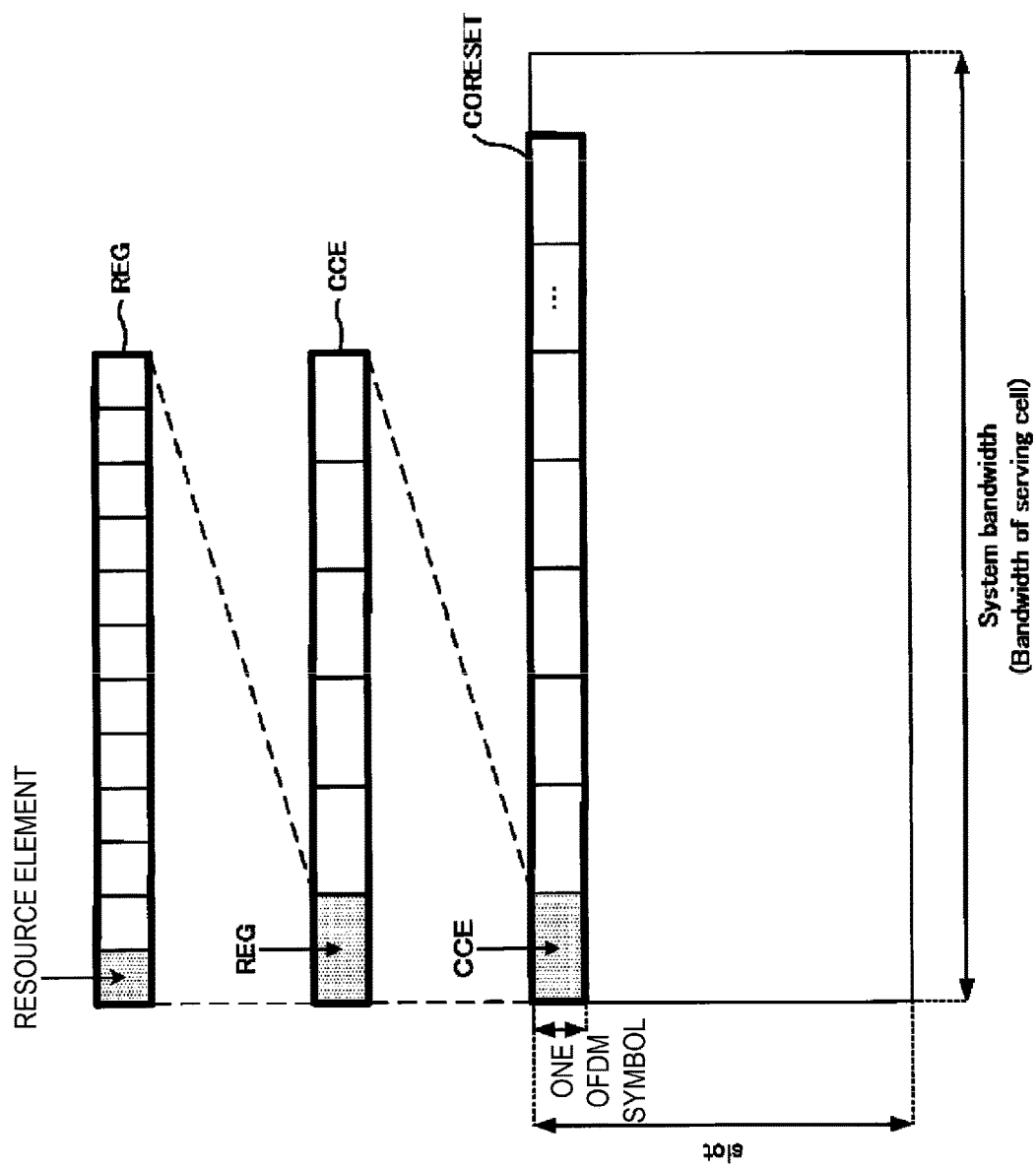
FIG. 9 is a diagram illustrating an example of a CORE-SET according to the present embodiment.

FIG. 9 is a diagram illustrating an example of a CORESET according to the present embodiment. In the time domain, the CORESET may be included in the first OFDM symbol of the slot. The CORESET may be constituted by multiple resource elements contiguous in the frequency domain. The CORESET may be constituted by multiple CCEs. One CCE may be constituted by six contiguous REGs in the frequency domain. One REG may be constituted by 12 contiguous resource elements in the frequency domain.

Figure 10:
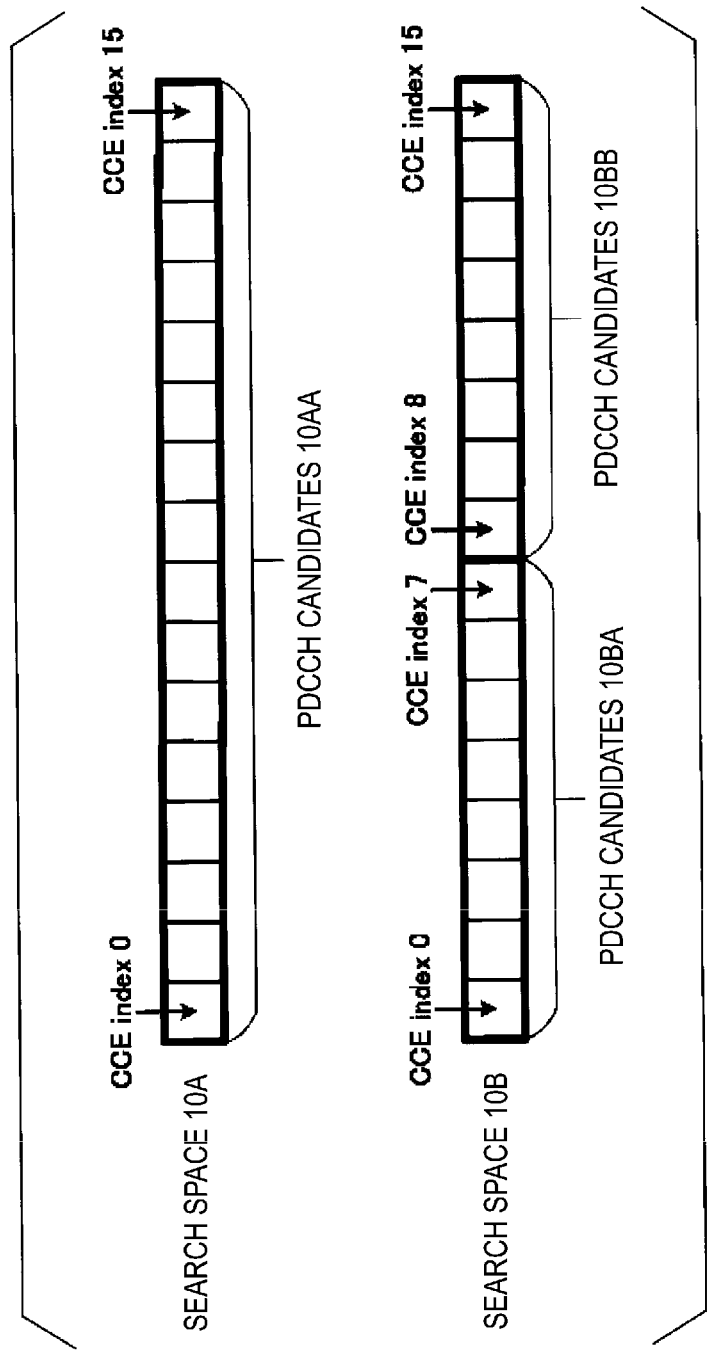
FIG. 10 is a diagram illustrating an example of a search space according to the present embodiment.

FIG. 10 is a diagram illustrating an example of a search space according to the present embodiment. The search space is a set of PDCCH candidates. The PDCCH is transmitted in a PDCCH candidate. The terminal apparatus 1 attempts to decode a PDCCH in the search space. The PDCCH candidate may be constituted by one or multiple continuous CCEs. The number of CCEs constituting the PDCCH candidate is also referred to as an aggregation level. The search space may be defined for each aggregation level. The search space 10A includes PDCCH candidates 10AA having an aggregation level of 16. The search space 10B includes PDCCH candidates 10BA and 10BB, each having an aggregation level of 8.

Hereinafter, various aspects of the terminal apparatus 1 and the base station apparatus 3 according to the present embodiment will be described.

(1) A first aspect of the present embodiment is a terminal apparatus 1 including: a receiver configured to receive an activation/deactivation MAC CE indicating activation of a secondary cell, and a medium access control layer processing unit configured to activate a first downlink BWP of multiple downlink BWPs, based at least on the reception of the activation/deactivation MAC CE, and none of the multiple downlink BWPs included in the secondary cell being activated. For example, in a case that the MAC CE indicating the activation of the secondary cell is received, the terminal apparatus 1 may activate the default downlink BWP 832, based at least on all of the downlink BWPs 831, 832, 833, and 834 in the secondary cell being not activated.

(2) In the first aspect of the present embodiment, the medium access control layer processing unit does not activate the first downlink BWP even in a case that the activation/deactivation MAC CE is received, in a case that a downlink BWP other than the first downlink BWP is activated in the multiple downlink BWPs. For example, in a case that any of the non-default downlink BWPs 831, 833, and 834 included in the secondary cell has already been activated, the default downlink BWP 832 may not be activated, based on the reception of the activation/deactivation MAC CE indicating the activation of the secondary cell. For example, in a case that the default downlink BWP 832 included in the secondary cell has already been activated, the default downlink BWP 832 may or may not be reactivated, based on the reception of the activation/deactivation MAC CE indicating the activation of the secondary cell.

(3) In the first aspect of the present embodiment, each of the multiple downlink BWPs corresponds to an index, and the first downlink BWP corresponds to the smallest index. The RRCConnectionReconfiguration message 605 may include information indicating an index of a downlink BWP.

(4) In the first aspect of the present embodiment, the first downlink BWP is indicated by a parameter (RRCConnectionReconfiguration message 605) received from the base station apparatus.

(5) A second aspect of the present embodiment is a base station apparatus 3 including: a transmitter configured to transmit an activation/deactivation MAC CE indicating activation of a secondary cell to a terminal apparatus; and a medium access control layer processing unit configured to control a downlink BWP to be activated in multiple downlink BWPs included in the secondary cell by transmitting the activation/deactivation MAC CE, wherein a first downlink BWP in the multiple downlink BWPs is activated by the terminal apparatus, based at least on the reception of the activation/deactivation MAC CE, and none of the multiple downlink BWPs included in the secondary cell being activated.

(6) A third aspect of the present embodiment is a terminal apparatus 1 including: a receiver configured to receive an activation/deactivation MAC CE indicating activation of a secondary cell; and a medium access control layer processing unit configured to activate a function related to monitoring of a PDCCH in a first CORESET set, based at least on the reception of the activation/deactivation MAC CE, and none of the multiple downlink BWPs included in the secondary cell being activated, wherein the first CORESET includes one or more of multiple CORESETs included in the secondary cell. The first CORESET set corresponds to the configuration of the first CORESET. For example, the first CORESET set may include the CORESETs 801 and 802. Activating a downlink BWP is activating a function related to monitoring of a PDCCH in one or more CORESETs belonging to the downlink BWP.

(7) In a third aspect of the present embodiment, the medium access control layer processing unit is configured to: based on BWP index information included in a PDCCH detected in the first CORESET set, deactivate a function related to the monitoring of the PDCCH in the first CORESET set; and activate a function related to the monitoring of the PDCCH in a second CORESET set, wherein the second CORESET set includes one or more of multiple CORESETs included in the secondary cell. The second CORESET set corresponds to the configuration of the second CORESET. For example, the second CORESET set may include the CORESETs 811 and 812.

(8) In the third aspect of the present embodiment, in a case that a function related to monitoring of a PDCCH in a set of CORESET different from the first CORESET set is activated, even in a case that the activation/deactivation MAC CE is received, the function related to the monitoring of the PDCCH in the first CORESET set is not activated, wherein the set of CORESET different from the first CORESET set includes one or more of multiple CORESETs included in the secondary cell. For example, in a case that an activation/deactivation MAC CE indicating activation of a secondary cell is received, a function related to monitoring of a PDCCH in the first CORESET set may not be activated, in a case that a function related to monitoring of a PDCCH in a second CORESET set and/or a third CORESET set has already been activated. For example, in a case that an activation/deactivation MAC CE indicating activation of a secondary cell is received, a function related to monitoring of a PDCCH in a CORESET AAA may not be activated, in a case that a function related to monitoring of a PDCCH in a CORESET BBB in CORESETs AAA, BBB, and CCC has already been activated. The third CORESET set corresponds to the configuration of the third CORESET. For example, in a case that the function related to the monitoring of the PDCCH in the second CORESET set 813 and 814 and the third CORESET set 821 and 822 has already been activated, even in a case that the activation/deactivation MAC CE indicating the activation of the secondary cell is received, the function related to the monitoring of the PDCCH in the first CORESET set corresponding to the configuration of the first CORESET may not be activated.

(9) A fourth aspect of the present embodiment is a base station apparatus 3 including: a transmitter configured to transmit an activation/deactivation MAC CE indicating activation of a secondary cell to a terminal apparatus; and a medium access control layer processing unit configured to control a CORESET for which a function related to monitoring of a PDCCH is activated by the terminal apparatus in multiple CORESETs included in the secondary cell, by transmitting the activation/deactivation MAC CE, wherein a function related to monitoring of a PDCCH in a first CORESET set is activated by the terminal apparatus, based at least on the reception of the activation/deactivation MAC CE, and none of the multiple downlink BWPs included in the secondary cell being activated, and the first CORESET includes one or more of multiple CORESETs included in the secondary cell.

According to the above, the terminal apparatus 1 and the base station apparatus 3 are capable of efficiently perform the downlink transmission and reception.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus that performs communication via a primary cell and a secondary cell, the terminal apparatus comprising:
  reception circuitry configured to receive an activation/deactivation Medium Access Control (MAC) Control Element (CE) indicating activation of the secondary cell; and
  medium access control layer processing circuitry configured to:
    activate a first downlink bandwidth part (BWP) in multiple downlink BWPs included in the secondary cell in a case that the activation/deactivation MAC CE is received and the secondary cell has not been activated, and
    not to activate the first downlink BWP in a case that the activation/deactivation MAC CE is received, and the secondary cell and a second downlink BWP of the secondary cell have been activated before the activation/deactivation MAC CE is received, wherein
    the first downlink BWP is different from the second downlink BWP.

2. The terminal apparatus according to claim 1, wherein activating the first downlink BWP is indicated by a Radio Resource Control (RRC) message received from a base station apparatus.

3. A base station apparatus that performs communication via a primary cell and a secondary cell, the base station apparatus comprising:
  transmission circuitry configured to transmit an activation/deactivation Medium Access Control (MAC) Control Element (CE) indicating activation of the secondary cell to a terminal apparatus; and
  medium access control layer processing circuitry configured to control a downlink bandwidth part (BWP) to be activated in multiple downlink BWPs included in the secondary cell by transmitting the activation/deactivation MAC CE, wherein:
    a first downlink BWP in the multiple downlink BWPs is activated by the terminal apparatus in a case that the terminal apparatus receives the activation/deactivation MAC CE and the secondary cell has not been activated,
    the first downlink BWP in the multiple downlink BWPs is not activated by the terminal apparatus in a case that the terminal apparatus receives the activation/deactivation MAC CE, and the secondary cell and a second downlink BWP of the secondary cell have been activated before the activation/deactivation MAC CE is received, and
    the first downlink BWP is different from the second downlink BWP.

4. The base station apparatus according to claim 3, wherein
  activating the first downlink BWP is indicated by transmitting a Radio Resource Control (RRC) message.

5. A communication method used for a terminal apparatus that performs communication via a primary cell and a secondary cell, the communication method comprising:
  receiving an activation/deactivation Medium Access Control (MAC) Control Element (CE) indicating activation of the secondary cell;
  activating a first downlink bandwidth part (BWP) in multiple downlink BWPs included in the secondary cell in a case that the activation/deactivation MAC CE is received and the secondary cell has not been activated; and
  not activating the first downlink BWP in a case that the activation/deactivation MAC CE is received, and the secondary cell and a second downlink BWP of the secondary cell have been activated before the activation/deactivation MAC CE is received, wherein
  the first downlink BWP is different from the second downlink BWP.

6. A communication method used for a base station apparatus that performs communication via a primary cell and a secondary cell, the communication method comprising:
  transmitting an activation/deactivation Medium Access Control (MAC) Control Element (CE) indicating activation of the secondary cell to a terminal apparatus; and
  controlling a downlink bandwidth part (BWP) to be activated in multiple downlink BWPs included in the secondary cell by transmitting the activation/deactivation MAC CE, wherein:
    a first downlink BWP in the multiple downlink BWPs is activated by the terminal apparatus in a case that the terminal apparatus receives the activation/deactivation MAC CE and the secondary cell has not been activated,
    the first downlink BWP in the multiple downlink BWPs is not activated by the terminal apparatus in a case that the terminal apparatus receives the activation/ deactivation MAC CE, and the secondary cell and a second downlink BWP of the secondary cell have been activated before the activation/deactivation MAC CE is received, and
the first downlink BWP is different from the second downlink BWP.

* * * * *